United States Patent
Rocas et al.

(10) Patent No.: US 7,406,100 B2
(45) Date of Patent: Jul. 29, 2008

(54) BI-DIRECTIONAL SINGLE WIRE INTERFACE

(75) Inventors: Gabriel Rocas, Aix en Provence (FR); Nathalie Delage, Tourves (FR)

(73) Assignee: Atmel Corporation, San Jose, CA (US)

( * ) Notice: Subject to any disclaimer, the term of this patent is extended or adjusted under 35 U.S.C. 154(b) by 1090 days.

(21) Appl. No.: 10/443,153

(22) Filed: May 21, 2003

(65) Prior Publication Data

US 2004/0233917 A1    Nov. 25, 2004

(51) Int. Cl.
*H04J 3/06* (2006.01)
(52) U.S. Cl. ..................... 370/503
(58) Field of Classification Search ............. None
See application file for complete search history.

(56) References Cited

U.S. PATENT DOCUMENTS

| | | | |
|---|---|---|---|
| 3,943,283 A | 3/1976 | Caragliano et al. | 178/58 R |
| 4,683,530 A | 7/1987 | Quatse | 364/200 |
| 5,095,425 A | 3/1992 | Hesse | 395/350 |
| 5,237,322 A | 8/1993 | Heberle | 340/870.13 |
| 5,297,869 A * | 3/1994 | Benham | 375/361 |
| 5,495,240 A | 2/1996 | Heberle | 340/870.13 |
| 5,577,044 A * | 11/1996 | Oxford | 370/522 |
| 5,740,199 A * | 4/1998 | Sibigtroth | 370/503 |
| 5,819,051 A | 10/1998 | Murray et al. | 395/287 |
| 6,112,275 A | 8/2000 | Curry et al. | 711/100 |
| 6,128,317 A | 10/2000 | Mackre | 370/479 |
| 6,215,817 B1 * | 4/2001 | Kimura | 375/220 |
| 6,412,072 B2 | 6/2002 | Little et al. | 713/200 |
| 6,608,571 B1 * | 8/2003 | Delvaux | 707/100 |
| 6,772,251 B1 * | 8/2004 | Hastings et al. | 375/354 |
| 7,180,886 B2 * | 2/2007 | Liu et al. | 370/350 |
| 2003/0128719 A1 * | 7/2003 | Doyle | 370/509 |
| 2004/0208200 A1 * | 10/2004 | Hejdeman et al. | 370/476 |

* cited by examiner

*Primary Examiner*—Anh-Vu Ly
(74) *Attorney, Agent, or Firm*—Schwegman, Lundberg & Woessner P.A.

(57) ABSTRACT

A single-wire, bi-directional communication protocol is provided in which the sending device transmits its clock frequency and its bit transmission period and data through a predefined waveform pattern or "learning sequence" that is recognizable by the receiving device and in a period of time, as measured in number of sending clock cycles, that is known to the receiving device. By clocking the full length of the predefined waveform pattern using its own internal clock, the receiving device becomes aware of the bit transmission period of the sending device.

23 Claims, 3 Drawing Sheets

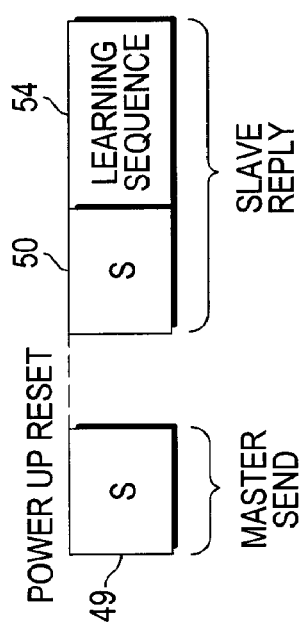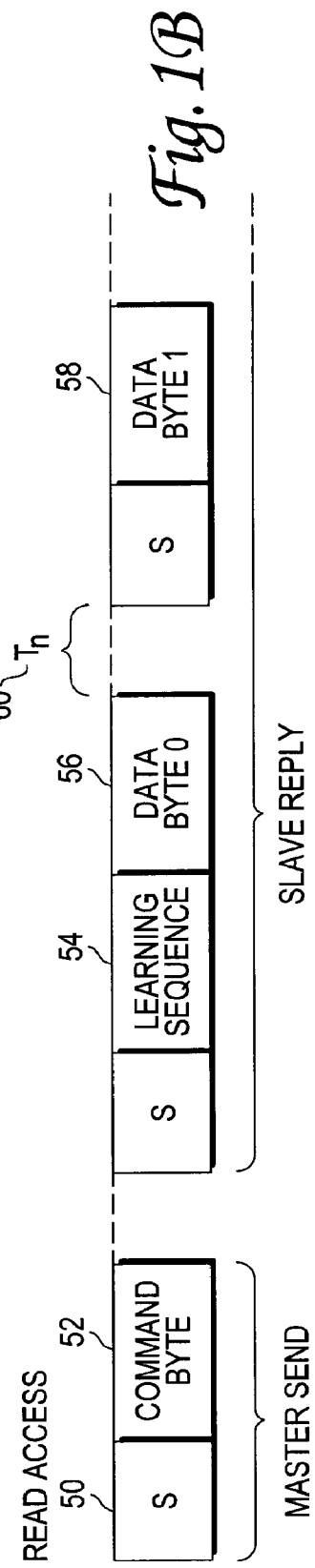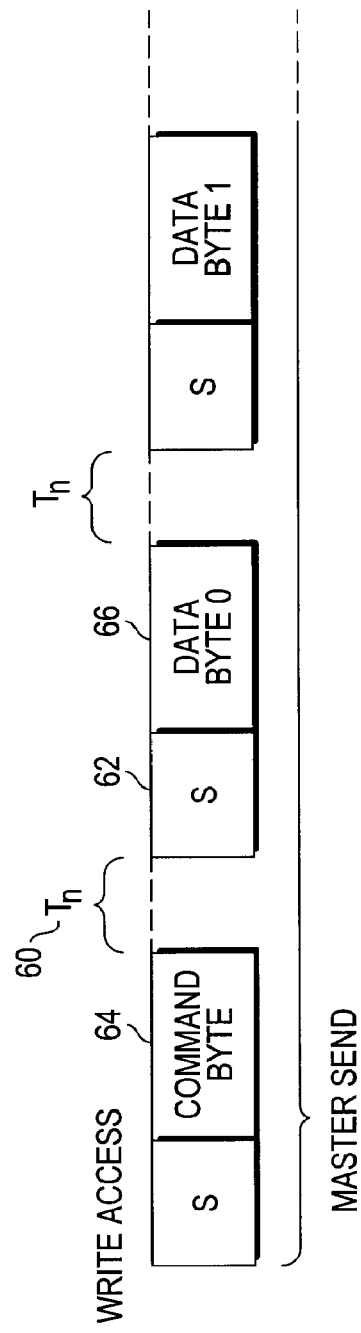

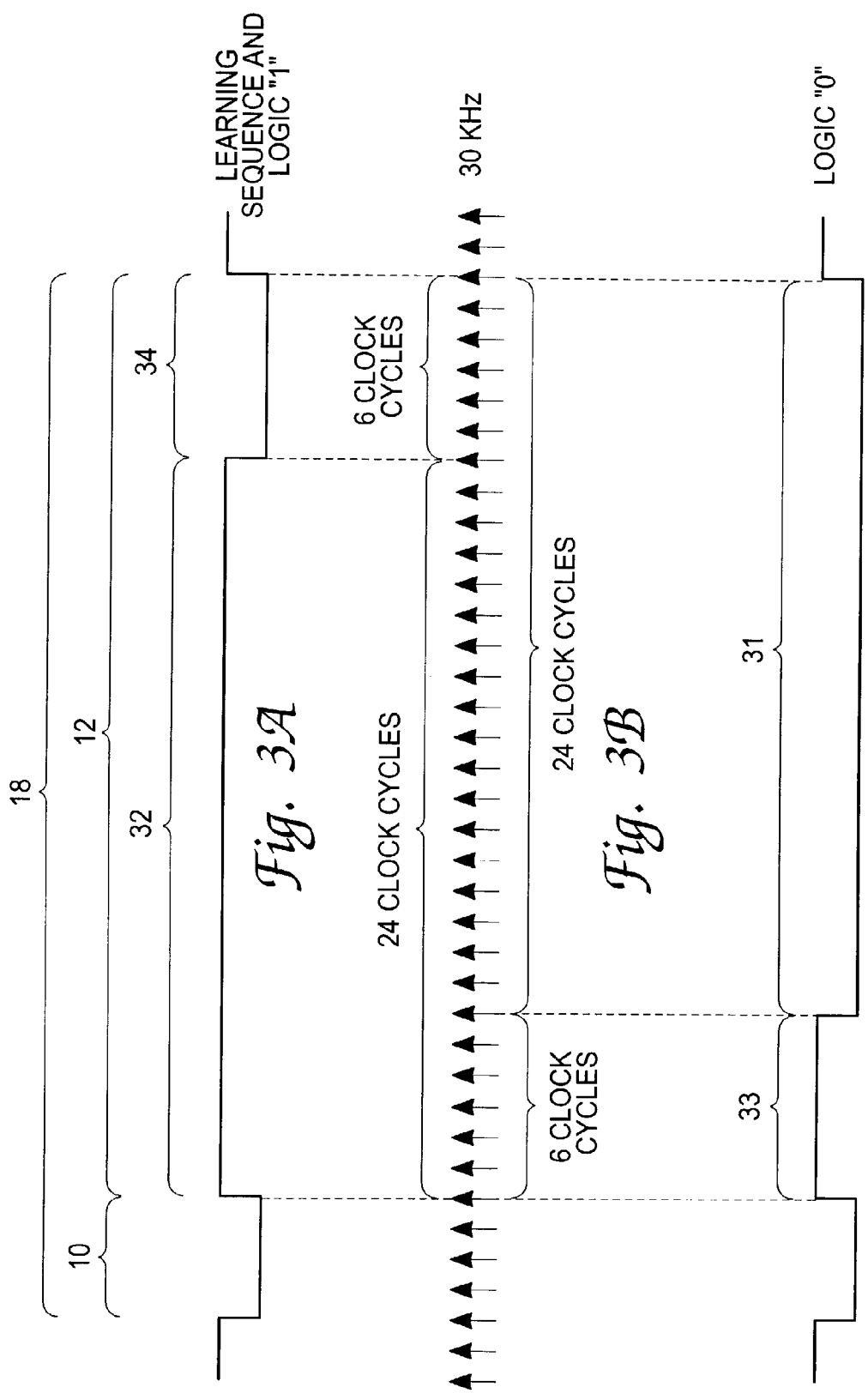

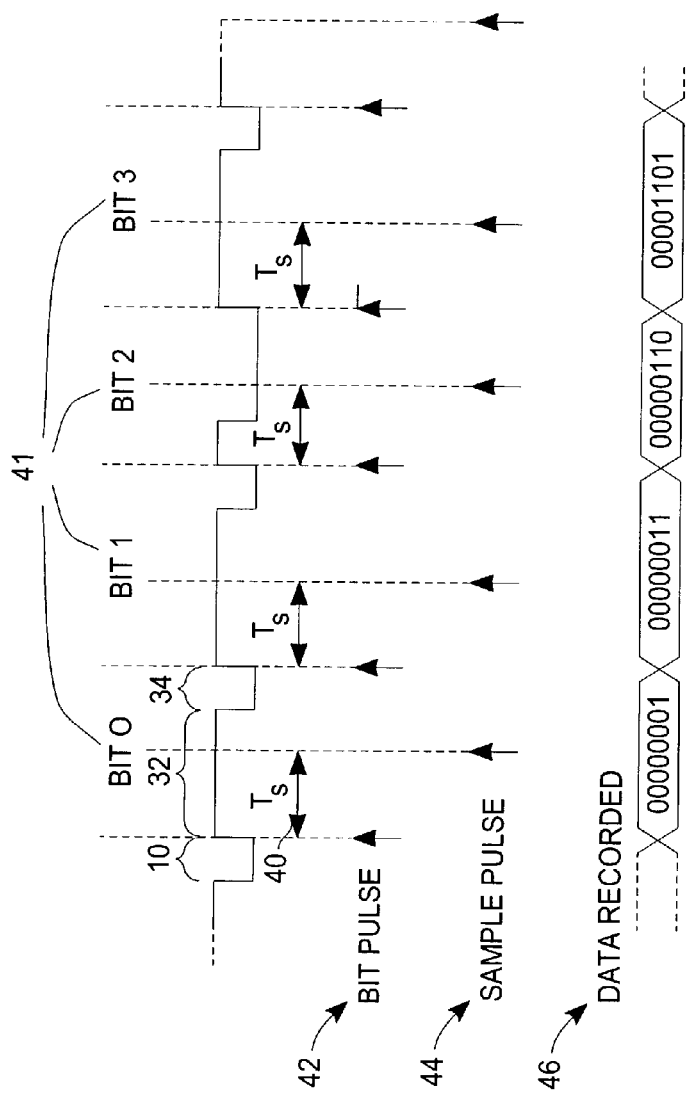
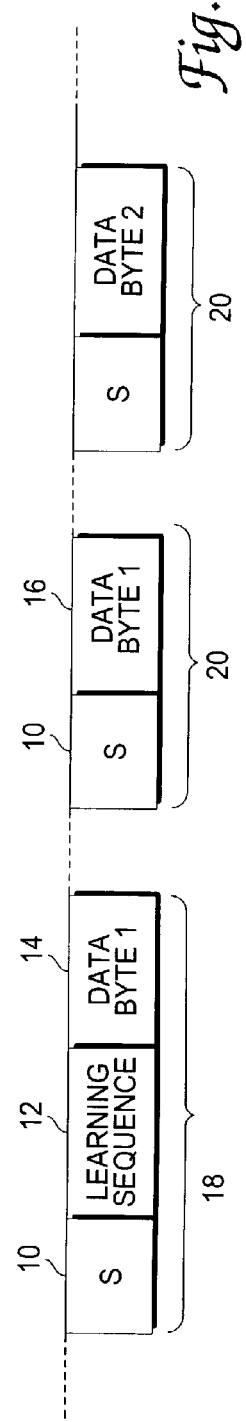

BI-DIRECTIONAL SINGLE WIRE INTERFACE

TECHNICAL FIELD

The present invention relates to communication protocols for the bi-directional transmission and reception of signals between two devices.

BACKGROUND ART

Conventional single-wire bi-directional communication systems of the prior art call for an accurate separate clock module to ensure synchronized data transmission between the sending device and the receiving device. U.S. Pat. No. 5,237,322 to Heberle describes a master with a separate clock generator tc that is used for generating an internal system clock cl. In addition, the clock signal is also sent through the single wire as a segment of periodic timing signal bt during wait state. The Heberle patent specifies that a specific end signal be used in the communication protocol. It would be desirable to have a simple communication protocol that does not require specific end signal.

DISCLOSURE OF THE INVENTION

The present invention is a method of transmitting clock frequency information through a single-wire, bi-directional communication system operating in an asynchronous mode through which a master learns the clock frequency of a slave device. Knowing the clock frequency of the slave device allows the master to adjust its data sampling rate and data transmission rate for optimal data reception and transmission.

At the beginning of each transmission, the slave device makes its clock frequency known to the master device by transmitting a distinctive waveform that has a predefined pattern and a preset duration that is known to both the slave device and the master device. Once the master device recognizes the distinctive waveform, it uses its internal clock to measure the duration. Having the measured duration and the preset duration allows the master device to deduce the clock frequency in the slave device. Using this knowledge, the master device can then set the optimal sampling frequency for subsequent data transmission from the slave device.

In a preferred embodiment, the slave device transmits a waveform that is representative of a typical logic "1" and with a duration that is representative of the time it takes to send a single bit of data (bit time), as measured by the number of clock cycles that is known to both the slave and the master devices. The master device measures the bit time based on its internal clock, thereby obtaining the clock frequency of the slave device.

BRIEF DESCRIPTION OF THE FIGURES

FIG. 1a is a timing block diagram showing the power-up reset sequence according to an embodiment of the present invention.

FIG. 1b is a timing block diagram showing the sequence for a master to read from a slave device according to an embodiment of the present invention.

FIG. 2 is a timing block diagram showing the sequence for a master to write to a slave device according to an embodiment of the present invention.

FIGS. 3a-c are timing diagrams showing an embodiment of a learning sequence, logic "1", and logic "0" shown in FIG. 1.

FIG. 4 is a timing diagram showing an embodiment of the data detection protocol as described in the present invention.

FIG. 5 is a timing block diagram showing sequence for transmitting data between two peer devices through a single-wire as described in the present invention.

BEST MODE OF CARRYING OUT THE INVENTION

In a system where the communication is between a master and a slave device, each communication session is to be initiated by the master through a command sequence indicating whether it is intending to read or write from a memory location in the slave. The master device typically has a reliable clock whose frequency is stable over time while the slave device typically has a low cost oscillator whose frequency may fluctuate significantly from a nominal value. Through a learning sequence, the master device detects the sending frequency of the slave and adjusts its sampling frequency appropriately. Knowing the clock frequency of the slave device also allows the master to adjust its transmission bit time for optimal data detection by a slave with a fixed sampling rate.

FIG. 1a shows a power-up reset sequence by which a master and a slave device establish an initial contact. Upon power up or during reinitialization, the master sends a reset pulse 49. In reply, the slave sends a start pulse 50 and a learning sequence 54, which is a distinctive waveform having a clear beginning and end that allows a receiving device to clock its duration.

FIG. 1b shows, as an example, a sequence by which a master device initiates a memory read session and a slave device replies with the requested data. The sequence begins with the master sending a command byte 52 that contains information about the intended operation (to read) and the location of the data to be read (the memory location in the EEPROM in the slave). The slave replies with a learning sequence 54 that allows the master to measure the operating frequency of the clock in slave and the bit time of the slave. The learning sequence is immediately followed by a first data byte (byte 0). Each subsequent data byte 58 is sent after certain hold period $T_h$ 60. As shown in the figure, each subsequent transmission of a data byte is preceded by a start pulse 50.

FIG. 2 shows the steps taken by the master device for write access to the slave device. The sequence begins with a command byte 64 containing information about the intention to perform a write operation and the location of the memory to be written. After an elapse of a certain hold period $T_h$ 60, the master proceeds with sending a sequence of data bytes, beginning with the first data byte 66 (byte 0). As before, each transmission of a data byte is preceded by a start pulse 62 that signifies the beginning of a next byte transmission.

FIG. 3a shows a transmission session 18 that is comprised of a start pulse 10 and a learning sequence 12 that is in the form of a logic bit "1". For a line that carries a high voltage signal when it is idle, a start pulse 10 is a low voltage signal that is held for some predetermined number of clock cycles, signifying the beginning of a transmission session. The learning sequence 12, which begins immediately at the end of the start pulse 10, is a waveform with an initial high signal section 32 followed by a low signal section 34, with the duration of the high voltage signal being 4 times that of the low voltage signal. With reference to the clock transitions of the slave device shown in FIG. 3b, the high signal section 32 takes up 24 clock cycles while the low signal section 34 takes up 6 clock cycles.

The waveform pattern and duration for a learning sequence is also used for sending a logic bit "1" in subsequent data transmissions. Conversely, logic bit "0" is represented by a high voltage being held for 6 clock cycles 33 followed by a low voltage being held for 24 clock cycles and such a waveform is shown in FIG. 3C.

Once the master detects the start pulse, it waits for a rising voltage edge, which indicates the beginning of the learning sequence. Using its internal clock, the master measures the duration of the learning sequence. Knowing the slave always sends the learning sequence at a fixed number of slave clock cycles, the master device can deduce the clock frequency of the slave device. In a preferred embodiment, the slave operates in a nominal clock frequency of 30K Hz though, its frequency may fluctuate by as much as 50%. The master, on the other hand operates in a nominal clock frequency of 300K Hz with negligible variation. Now assume that at certain point during a transmission, the slave clock slows down to 15K Hz. When it sends a learning sequence, it still uses a fixed number, say 30, of clock cycles. To the master's clock, the learning sequence takes up 600 clock cycles (as opposed to the normal 300 clock cycles when the slave clock is running at 30K Hz.) In response, the master device would reduce its sampling rate and transmission rate for subsequent data reception and transmission by half to accommodate for the slower slave clock.

Since the slave device operates at a fixed sampling rate of 15 clock cycles, and since the clock in the slave device may change after the transmission of learning sequence, it is important that the slave samples any incoming data waveform at its valid portion. The valid portion for logic "1" is the high signal section 32 while the valid portion for the logic "0" is the low signal section 31. As the slave clock could vary over time, there may be times when the slave clock is running at a frequency that is so far off the nominal rate that sampling at the 15$^{th}$ clock cycle would return an erroneous data. To guard against such errors, it is necessary to set a limit on the acceptable bit time for each bit received. In the preferred embodiment, the bit time tolerance is set at ±30%. For a nominal bit time of 30 clocks cycles, the acceptable bit time would be approximately between 21 and 39 clock cycles. If the bit time of a received bit is outside of this range, the bit will be discarded and communication is reinitiated.

FIG. 4 shows how a sequence of data bits are detected in the slave device. The sequence of data bits 41 is preceded with a start pulse 10 followed by a first bit (bit 0) being represented by 24 slave clock cycles of high voltage 32 followed by 6 slave clock cycles of low voltage 34. The first clock transition coinciding with or immediately following the arrival of low-to-high transition marks the beginning of each data bit and shall be referred to as a "bit clock pulse" 42. The clock transition that is 15 clock cycles (Ts 40) after the bit clock pulse 42 marks the sampling point of the slave device, and shall be referred to as "sample clock pulse" 44. For bit 0 in FIG. 4, sampling after 15 clock cycles returns a high signal, which denotes the receipt of a logic "1". For bit 1, the voltage level is high when the sample clock pulse appears and thus a bit "1" is recorded. For bit 2, the voltage level is low when sample clock pulse appears and thus a bit "0" is recorded. For bit 3, the voltage level is high when the sample clock pulse appears and thus a bit "1" is recorded. The progression of recorded bits 46 is shown at the bottom of the FIG. 4.

Although the preferred embodiment described above relates to communication between a master device and a slave, the concept of using a learning sequence to transmit data clocking information may also be used in a single-wire communication system between any two peer devices each having an independent clock, provided that each device has the necessary circuitry to identify and make use of the learning sequence. FIG. 5 shows the sequence by which a sending device may send a series of data bytes 14 and 16. After the usual power up reset sequence as shown in FIG. 1a, the sending device initiate the transmission with a start pulse 10, which is followed immediately by a learning sequence 12 and data byte 0. Data may then be transmitted in independent data sequences 20 that begins with a start pulse 10 followed by data byte 114.

What is claimed is:

1. A method for carrying out bi-directional single-wire data communication between a first and a second device, each of which having a clock running at an independent frequency, comprising the steps of:
    a) having the first device send a learning sequence with a predetermined waveform pattern and a predetermined duration that represents a length of time, based on the clock in the first device, for transmitting a single bit to the second device;
    b) receiving the learning sequence by the second device, and analyzing the learning sequence to discover the clock frequency of the first device; and
    c) adjusting a sampling frequency based upon the discovered clock frequency.

2. The method of claim 1, wherein a signal sequence is preceded by a start sequence that signifies a beginning of a transmission and provides a synchronization point.

3. The method of claim 2, further comprising:
    maintaining a first voltage level while communication is idle; and
    initiating the start sequence where the start sequences comprises a waveform at a different voltage level held for at least two clock cycles.

4. The method of claim 1, wherein the learning sequence comprises a waveform with a first period of a first voltage level and a second period of a second voltage level.

5. The method of claim 4, wherein the first voltage level is held for a longer time than the second voltage level.

6. The method of claim 5, wherein the first period of first voltage level takes up about 80% of the duration of the learning sequence while the second period of second voltage level takes up about 20% of the duration of the learning sequence.

7. The method of claim 4, wherein the first voltage level is higher than the second voltage level.

8. The method of claim 4, wherein a subsequent signal transmission by a sending device has the first voltage level with a duration that is longer than a duration of the second voltage level for a representation of logic "1," while a duration of the first voltage level is shorter than a duration of the second voltage level for a representation of logic "0."

9. A method for carrying out bi-directional single wire data communication between a master device having a clock running at a first frequency and a slave device having a clock running at a second frequency, wherein the steps of reading data from the slave device by the master device comprising:
    a) having the master device send a first command sequence that notifies the slave device of an intent to read;
    b) having the slave device send, in response, a learning sequence with a predetermined waveform pattern and a predetermined duration that represents a length of time, based on the clock in the slave device, for transmitting a single bit;
    c) initiating in the master device a counting routine wherein a duration, in number of clock cycles, of the learning sequence is measured based on the clock in the master device.

10. The method of claim 9, wherein the steps of writing data to the slave device by the master device comprises:
   a) having the master device send a second command sequence that notifies the slave device of an intent to write; and
   b) having the master device send a data sequence which comprises a plurality of data bits, wherein at least one of the plurality of data bits has a predetermined waveform pattern and a predetermined duration based on the clock in the master device.

11. The method of claim 10, wherein a signal sequence is preceded by a start sequence that signifies the beginning of a transmission and provides a synchronization point.

12. The method of claim 11, further comprising:
   maintaining a first voltage level while communication is idle; and
   initiating the start sequence where the start sequence comprises a waveform at a different voltage level held for at least two clock cycles.

13. The method of claim 10, wherein the first and second command sequences contain addresses of memory to which the master device reads from or writes to respectively.

14. The method of claim 10, wherein the predetermined duration of the learning sequence is measured in a fixed number of slave clock cycles.

15. The method of claim 10, wherein the learning sequence and at least one of the plurality of data bits is represented by a waveform having a first voltage level followed by a second voltage level.

16. The method of claim 15, wherein the learning sequence has the first voltage level that is held for a longer time period than the second voltage level.

17. The method of claim 16, wherein the time period at the first voltage level takes up about 80% of the duration of the learning sequence, while the time period at the second voltage level takes up about 20% of the duration of the learning sequence.

18. The method of claim 15, wherein the first voltage level is higher than the second voltage level.

19. The method of claim 15, wherein at least one of the plurality of data bits has a first voltage level with a duration that is longer than a duration of the second voltage level for the representation of logic "1," while a duration of the first voltage level is shorter than a duration of the second voltage level for the representation of logic "0."

20. The method of claim 19, wherein at least one of the plurality of data bits will be rejected if a duration of a data bit as measured by the clock in the slave device is less than a first preset number or more than a second preset number, with the first preset number being less than the second preset number.

21. The method of claim 10, wherein the first and the second command sequences are a byte of data comprised of a single bit that indicates a desired operation and a plurality of bits that indicates a memory location on which to operate.

22. The method of claim 9, wherein a one time power-up reset sequence is carried out when the slave device is connected to the master device.

23. The method of claim 22, wherein the one time power-up reset sequence comprises the steps of:
   a) having the master device send a reset pulse; and
   b) having the slave device receive the reset pulse and reply with the start sequence and the learning sequence.

* * * * *